(12) United States Patent
Yoshida et al.

(10) Patent No.: US 7,639,220 B2
(45) Date of Patent: Dec. 29, 2009

(54) DISPLAY DEVICE AND LIGHT ADJUSTING METHOD THEREOF

(75) Inventors: Shohei Yoshida, Shimosuwa-cho (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 652 days.

(21) Appl. No.: 10/817,806

(22) Filed: Apr. 6, 2004

(65) Prior Publication Data

US 2004/0248022 A1 Dec. 9, 2004

(30) Foreign Application Priority Data

Apr. 23, 2003 (JP) ............................. 2003-118227

(51) Int. Cl.
*G03G 17/04* (2006.01)
(52) U.S. Cl. ........................ 345/87; 345/84; 345/88; 345/89; 353/31
(58) Field of Classification Search ................... 353/31; 345/84, 87, 88, 89
See application file for complete search history.

(56) References Cited

U.S. PATENT DOCUMENTS

| | | | |
|---|---|---|---|
| 5,717,422 A | 2/1998 | Fergason | |
| 6,330,039 B2 | 12/2001 | Matsui et al. | |
| 6,343,862 B1 * | 2/2002 | Sawai et al. | 353/1 |
| 6,547,400 B1 * | 4/2003 | Yokoyama | 353/98 |
| 6,674,415 B2 * | 1/2004 | Nakamura et al. | 345/32 |
| 6,676,260 B2 * | 1/2004 | Cobb et al. | 353/31 |
| 6,783,241 B2 * | 8/2004 | Miyawaki et al. | 353/20 |
| 6,783,244 B1 * | 8/2004 | Okuyama et al. | 353/57 |
| 6,816,141 B1 | 11/2004 | Fergason | |
| 6,824,276 B2 * | 11/2004 | Kimura | 353/84 |
| 6,869,190 B2 * | 3/2005 | Goto et al. | 353/85 |
| 6,909,454 B2 * | 6/2005 | Hunt | 348/96 |
| 7,019,736 B2 * | 3/2006 | Allen et al. | 345/207 |
| 7,088,388 B2 * | 8/2006 | MacLean et al. | 348/234 |
| 7,093,941 B2 | 8/2006 | Kawashima et al. | |
| 7,212,344 B2 * | 5/2007 | Keuper et | 359/618 |
| 7,287,860 B2 * | 10/2007 | Yoshida et al. | 353/31 |
| 2003/0085857 A1 * | 5/2003 | Ramanujan | 345/87 |
| 2003/0086265 A1 | 5/2003 | Iisaka et al. | |
| 2003/0142275 A1 * | 7/2003 | Yoshida | 353/31 |
| 2003/0164927 A1 * | 9/2003 | Tsukada | 353/31 |
| 2003/0184718 A1 * | 10/2003 | Childers et al. | 353/122 |

(Continued)

FOREIGN PATENT DOCUMENTS

JP A 3-179886 8/1991

(Continued)

*Primary Examiner*—Bipin Shalwala
*Assistant Examiner*—Afroza Y Chowdhury
(74) *Attorney, Agent, or Firm*—Oliff & Berridge, PLC

(57) ABSTRACT

The invention provides a display device and a light adjusting method thereof capable of carrying out light adjustment effectively by the output control of a light source and, preferably, of effecting light adjustment according to color distribution of a displayed image. The display device of the invention that is capable of adjusting a displayed image by changing light flux can include a plurality of light sources having light emitting diodes, an image analyzing unit for outputting a light control signal for controlling the output of each of the light sources, based on an image signal of the displayed image, and a light control device for controlling the output of each of the light sources based on the light control signals.

8 Claims, 8 Drawing Sheets

U.S. PATENT DOCUMENTS

| | | | |
|---|---|---|---|
| 2003/0214633 A1* | 11/2003 | Roddy et al. | 353/31 |
| 2003/0227577 A1* | 12/2003 | Allen et al. | 348/742 |
| 2004/0075778 A1* | 4/2004 | Yamakawa | 348/744 |
| 2004/0114114 A1* | 6/2004 | Yano et al. | 353/84 |
| 2006/0050245 A1* | 3/2006 | Arai et al. | 353/85 |
| 2006/0274026 A1* | 12/2006 | Kerofsky | 345/102 |

FOREIGN PATENT DOCUMENTS

| | | |
|---|---|---|
| JP | A 5-66501 | 3/1993 |
| JP | A-10-282470 | 10/1998 |
| JP | A-10-326080 | 12/1998 |
| JP | A 11-296127 | 10/1999 |
| JP | A 2001-166739 | 6/2001 |
| JP | A-2002-278505 | 9/2002 |
| JP | A-2003-036063 | 2/2003 |
| JP | A-2003-066369 | 3/2003 |
| JP | A-2003-330103 | 11/2003 |
| JP | A-2004-012876 | 1/2004 |
| WO | WO 2004/059608 A1 | 7/2004 |

* cited by examiner

DISPLAY DEVICE AND LIGHT ADJUSTING METHOD THEREOF

BACKGROUND OF THE INVENTION

1. Field of Invention

The present invention relates to a display device and a light adjusting method thereof.

2. Description of Related Art

A conventional projection type display device can have the following problems. Because of leaked light or stray light that occurs in several optical elements constituting an optical system, sufficient contrast is not obtained. That is, the displayable brightness range (dynamic range) is narrow, and image quality is inferior as compared to an existing image monitor using a cathode ray tube (hereinafter, referred to as CRT). Although quality improvement of an image is sought by various image signal processes, it is impossible to exhibit sufficient effects because of a fixed dynamic range.

As a solution for the problems associated with such a projection type display device, namely, a method of expanding the dynamic range, it can be considered to change the flux of a light component incident to the light modulating means (light valve) according to an image signal. The most convenient method for realizing it is to change the light output intensity of a lamp. A method of effecting control of the output light component of a metal halide lamp in the projection type liquid crystal display device is disclosed, for example, in Japanese Unexamined Patent Application Publication No. 3-179886. Further, because light emitting spectral variations by which output variation is accompanied in the white light source occurs, effecting the display by correcting it has been proposed, for example, in Japanese Unexamined Patent Application Publication No. 11-296127.

SUMMARY OF THE INVENTION

However, although a technique described in the Japanese Unexamined Patent Application Publication No. 11-296127 is employed, light emitting spectral variation of a white light source is complicated and a large sized correcting circuit is required. Further, in cases in which there is deflection in color distribution of a displayed image, efficient light adjustment in a white light source cannot be carried out, and then effects by light adjustment cannot be sufficiently obtained.

It is an object of the invention to provide a display device and a light adjusting method thereof capable of effectively carrying out light adjustment by the output control of light sources and, preferably, of light adjustment depending on the color distribution of a displayed image.

A display device of the invention that is capable of adjusting a displayed image by changing the illuminating light flux, is characterized in that it can include a plurality of light sources having light emitting diodes, image analyzing device for outputting a light control signal for controlling the output of each of the light sources based on an image signal of the displayed image, and light control device for controlling the output of each of the light sources based on the light control signals.

According to the display device, in order to carry out a display by changing the illuminating light flux, a light control signal is set based on the image signal inputted to the image analyzing device, and the output of the light emitting diode element is controlled by the light control device based on the light control signal so that the light emitting amount is changed, thereby carrying out accurate light adjustment with good control. Further, because excellent temporal controllability is possible by a high speed response of the light emitting diode element, the device can be very suitably employed as a projection type display device of a color sequential manner for carrying out a display by modulating time-divisionally different colored light components.

Further, it is possible to provide a projection type display device with high reliability in a simplified construction, since it is unnecessary to consider reliability or durability such as deterioration of the light adjusting element due to light irradiation or deterioration of a mechanical structure of the shutter, as in the case of carrying out light adjustment by blocking light from the light source using a liquid crystal light adjustment element, a mechanical shutter or the like.

The display device of the invention may have a construction in which the image analyzing device outputs the light control signal based on the average of the image signal inputted in a predetermined period. By calculating the image processing parameter using this average value as a feature, it is possible to carry out light adjustment without losing the atmosphere of the image viewed by an observer.

The display device of the present invention may have a configuration in which the image analyzing device outputs the light control signal based on the maximum of the image signal inputted in a predetermined period. Because the maximum value of luminance can be shared with an expansion coefficient (expansion parameter), it is possible to simplify the construction of the image analyzing device and it is possible to lower the cost. In addition, there is an advantage that, since an image area where gray tone collapse occurs due to the expansion process can be suppressed to a minimum, it is possible to obtain a display faithful to an inputted image signal.

The display device of the invention may have a construction in which the image analyzing device outputs the light control signal based on the luminance distribution of the image signal inputted in a predetermined period. By setting the light control signal based on a luminance distribution, it is possible to set an image processing parameter with more a carefully considered display area while avoiding an unexpected data, such as a noise, and to effectively suppress a flickering screen due to light adjustment.

The display device of the invention may have a construction in which the signal resolution (bit width) of the light control signal inputted to the light control device is made different according to the relative luminous efficiency of a colored light component outputted from the plurality of light sources. It is possible to carry out effective light adjustment with respect to a user by adopting such a configuration.

Further, it is preferable that the display device of the invention may have a construction in which the signal resolution of the light control signal corresponding to a green colored light component of colored light components outputted from the light sources is larger than that of the light control signal corresponding to other colored light components.

The signal resolution of the light control signal becomes higher with respect to the light source for outputting the green colored light component with a human's high relative luminous efficiency, and output control is carried out more finely, resulting in improvement in substantial gray scale display to the observer. In other words, because it is possible to allow an observer to recognize fine control on different colors by carrying out fine control on a color with a high relative luminous efficiency in which an observer sensibly recognizes a variation in luminance or chroma, it is possible to simplify the construction of the drive circuit as compared to a case of improving the signal resolution of the light control signal corresponding to three colors, and to realize a projection type display device with excellent gray scale display at a low cost.

The display device of the invention may have a construction including the output balance correcting means for executing a signal correcting process on the image control signal in order to correct the white balance of the displayed image. With this construction, it is possible to provide a display device in which white balance variation of the displayed image due to light adjustment can be prevented effectively, and a high definition displayed image can be obtained.

Further, the display device of the invention may have a construction in which the output balance correcting means comprises a lookup table including output property information of each of the light sources. With this construction, it is possible to provide a display device in which correction of the output balance can be carried out flexibly and rapidly using the lookup table, and a high quality image can be obtained.

Next, the display device of the invention, which is capable of adjusting a displayed image by changing the illuminating light flux, can be characterized in that it includes a plurality of light sources having light emitting diodes and capable of outputting different colored light components, a light modulating device disposed correspondingly to each of the light sources for modulating each of the colored light components, an image analyzing device for outputting a plurality of light control signals for controlling the output of each of the light sources based on a color signal corresponding to each of the colored light components included in the image signal of the displayed image, and a light control device for controlling the output of each of the light sources based on the light control signals.

According to this display device, in order to carry out a display by changing the illuminating light flux, the output of the light emitting diode element is controlled by a light control signal based on the inputted image signal, the light emitting amount thereof is changed, and the light control signal is independently set for each color signal, so that accurate light adjustment is carried out easily. In addition, even in cases in which there is deflection in color distribution of the displayed image, it is possible to carry out light adjustment very effectively. Needless to say, exallent temporal controllability is also possible by the high-speed response of the light emitting diode element, and it is possible to always obtain an improvement effect of reliability dependent on an unnecessary light-adjusting element such as a shutter.

The display device of the invention may have a construction in which the image analyzing device outputs each of the light control signals based on the average of each of the color image signals inputted in a predetermined period. By calculating the image processing parameter using this average, it is possible to carry out light adjustment with the impression of the original image.

The display device of the invention may have a construction in which the image analyzing device outputs each of the light control signals based on the maximum of each of the color image signals inputted in a predetermined period. Because the maximum value of luminance can be shared with an expansion coefficient (expansion parameter), it is possible to simplify the construction of the image analyzing device and it is possible to lower the cost. Further, there is an advantage in that, since an image area where gradient is saturated due to the expansion process can be suppressed to a minimum, it is possible to obtain a display faithful to an inputted image signal.

The display device of the invention may have a construction in which the image analyzing device outputs each of the light control signals based on the luminance distribution of each of the color signals inputted in a predetermined period. By setting the light control signal based on a luminance distribution, it is possible to set an image processing parameter with a more carefully considered display area while avoiding an unexpected data portion such as a noise, and to effectively suppress a flickering screen due to light adjustment.

The display device of the invention may have a construction in which the image analyzing device sets each of the light control signals using a different value for each of the color signals. By allowing the feature for setting the light control signal to be changed for each color signal as described above, it is possible to set a light control signal more flexibly and properly, thereby promoting improved image quality with light adjustment.

The display device of the invention may have a construction in which the image analyzing device is able to output an image control signal for modulating the image signal, and the device can include image processing device for modulating the image signal of the displayed image based on the image control signal. With this construction, since the display is carried out by effecting an image process based on image analysis by the image analyzing device, it is possible to obtain a high quality display suitable for the light adjustment display. Further, since image processing is possible for darkening a black display portion by offset processing, effects by the light adjustment display is further promoted, thereby promoting high quality.

Next, a light adjusting method of a display device capable of adjusting a displayed image by changing the illuminating light flux is characterized in that it includes, in order to control the fluxes of light components irradiated from a plurality of light sources having light emitting diodes to light modulating device, an image analyzing step of outputting a light control signal for controlling the output of each of the light sources based on the image signal of the displaying image, and a light control step of controlling the output of each of the light sources based on the light control signals. With this light adjusting method, since the light control signal based on the inputted image signal is outputted in the image analyzing step, and the output of the light emitting diode element is controlled in the subsequent light control step so that the light emitting intensity thereof is changed, it is possible to carry out accurate light adjustment easily, and also to perform high speed light adjustment due to the high speed response of the light emitting diode element.

It is preferable that in the light adjusting method of the invention, the image analyzing step outputs the light control signal with different signal resolutions according to the relative luminous efficiency of a colored light component outputted from the light source. By allowing a change of signal resolution of the light control signal according to a human's relative luminous efficiency as described above, it is possible to realize improvement, and to obtain an excellent display image quality in practical at a low cost.

It is preferable in the light adjusting method of the invention to adjust the white balance of the displayed image by adjusting the output balance of each light source when the output of the light source is controlled in the light control step. With this method, color tone variation upon light adjustment due to the output property of the light source can be prevented effectively, thereby obtaining a high quality light adjustment display.

Next, a light adjusting method of a display device of the invention, which is capable of adjusting a displayed image by changing the illuminating light flux, can be characterized in that it includes, in order to the control flux of a light component irradiated from a plurality of light sources having light emitting diodes for emitting different colored light components to light modulating means disposed correspondingly to the plurality of light sources, an color analyzing step of outputting a light control signal for controlling the output of each of the light sources based on a color signal corresponding to each colored light component included in the color signal of the displayed image, and a light control step of controlling the output of each of the light sources based on the light control signals.

With this method, since the light control signal based on the inputted image signal is outputted in the image analyzing step, and the output of the light emitting diode element is controlled in the subsequent light control step so that the light emitting amount thereof is changed, it is possible to effect accurate light adjustment easily, and also, since the light control signal for controlling the output of the light source is set based on analysis for each image signal, it is possible to carry out light adjustment very efficiently even though there is deflection in color distribution of the displayed image.

In the light adjusting method of the present invention, the light control signal can be set based on different values for each of the color signals upon setting the light control signal in the image-analyzing step.

By applying the different value for setting the light control signal for each image signal as described above, it is possible to set the light control signal more flexibly and properly, and to promote image quality improvement of the displayed image upon light adjustment.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereinafter, embodiments of the invention will be described with reference to the accompanying drawings.

Figure 1:
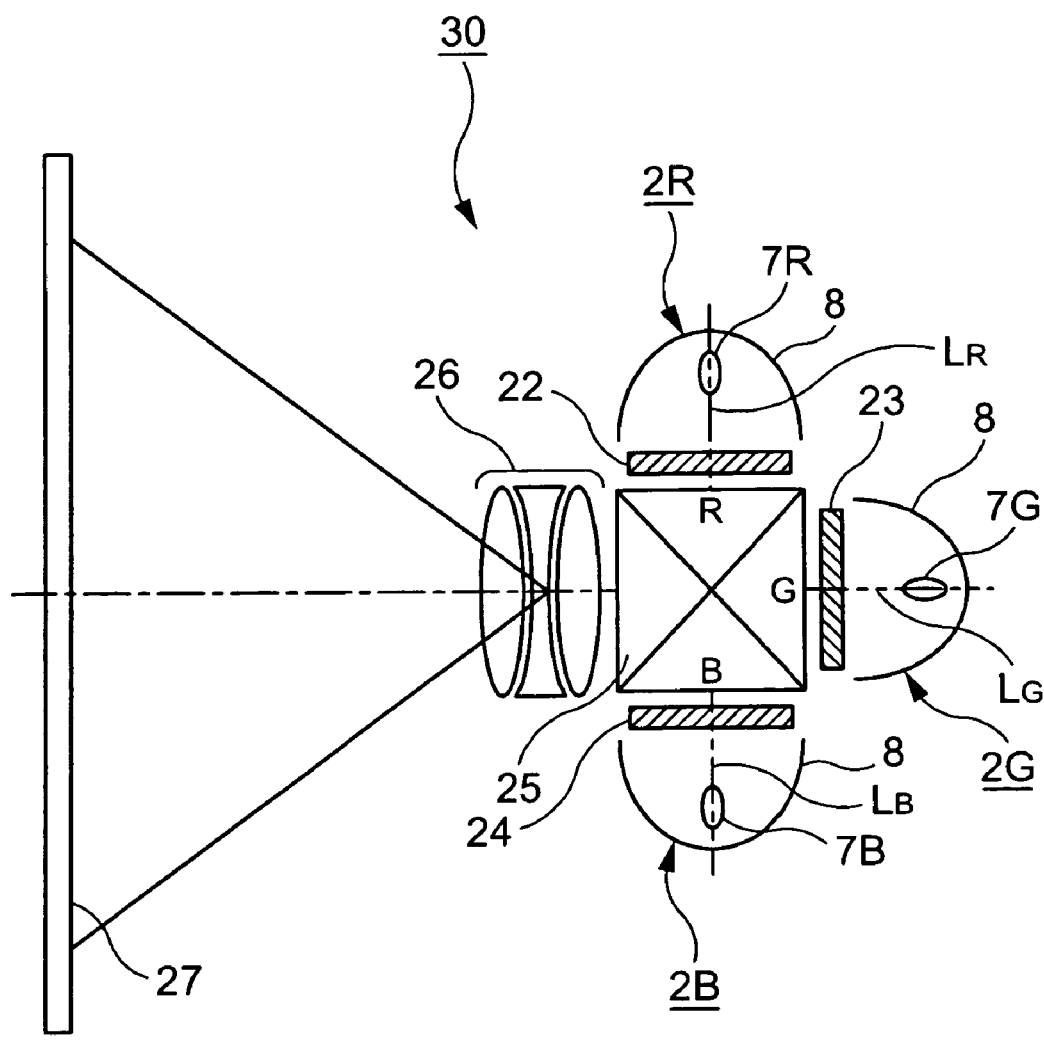
FIG. 1 is a schematic configuration diagram of a projection type display device of a first embodiment.

FIG. 1 is a schematic configuration diagram of a projection type display device, which is a first embodiment of a display device according to the invention. A projection type display device 30, shown in FIG. 1, comprises light sources 2R, 2G and 2B, each capable of emitting different colored light component, liquid crystal light valves (light modulating means) 22 to 24, a dichroic prism 25, and a projection system 26. A reference numeral 27 is a screen on which an image is projected and displayed.

The light source 2R is composed of a lamp 7R for emitting a red colored light component LR, and a reflector 8 for reflecting the light of the lamp 7R. The light source 2G is composed of a lamp 7G for emitting a green colored light component LG, and a reflector 8 for reflecting the light of the lamp 7G. The light source 2B is composed of a lamp 7B for emitting a blue colored light component LB, and a reflector 8 for reflecting the light of the lamp 7B. The lamps 7R, 7G and 7B can include an LED (light emitting diode) element that emits each of the colored light components.

The light sources 2R, 2G and 2B are disposed correspondingly to the liquid crystal light valves (light modulating means) 22, 23 and 24.

The red colored light component LR emitted from the light source 2R is incident to the liquid crystal light valve 22 for the red colored light component, where it is modulated. The green colored light component LG emitted from the light source 2G is incident to the liquid crystal light valve 23 for the green colored light component, where it is modulated. The blue colored light component LB emitted from the light source 2B is incident to the liquid crystal light valve 24 for the blue colored light component, where it is modulated.

Three colored light components modulated by respective liquid crystal light valves 22, 23 and 24 are incident to the cross dichroic prism 25, where the three colored light components are mixed to form a light component representing a color image. The mixed light component is projected onto the screen 27 by a projection system 26 composed of projection lens or the like, so that an enlarged image is projected.

An image processing unit (not shown in FIG. 1) for carrying out a predetermined image process on each colored light component is connected to each of the liquid crystal light valves 22 to 24, and the image signal subject to the predetermined image process in the image processing unit is supplied via a light valve driver to each of the liquid crystal light valves 22 to 24. Further, an image analyzing unit (not shown) is connected via a light control driver to each of the light sources 2R, 2G and 2B, and is adapted to control the output of each of the light sources 2R, 2G and 2B based on the analysis of the image signal by the image analyzing unit.

The projection type display device according to the present embodiment carries out an image display based on the image process in the image processing unit and the output control (light adjustment) of the light source by the image analyzing unit and the light control driver.

Figure 2:
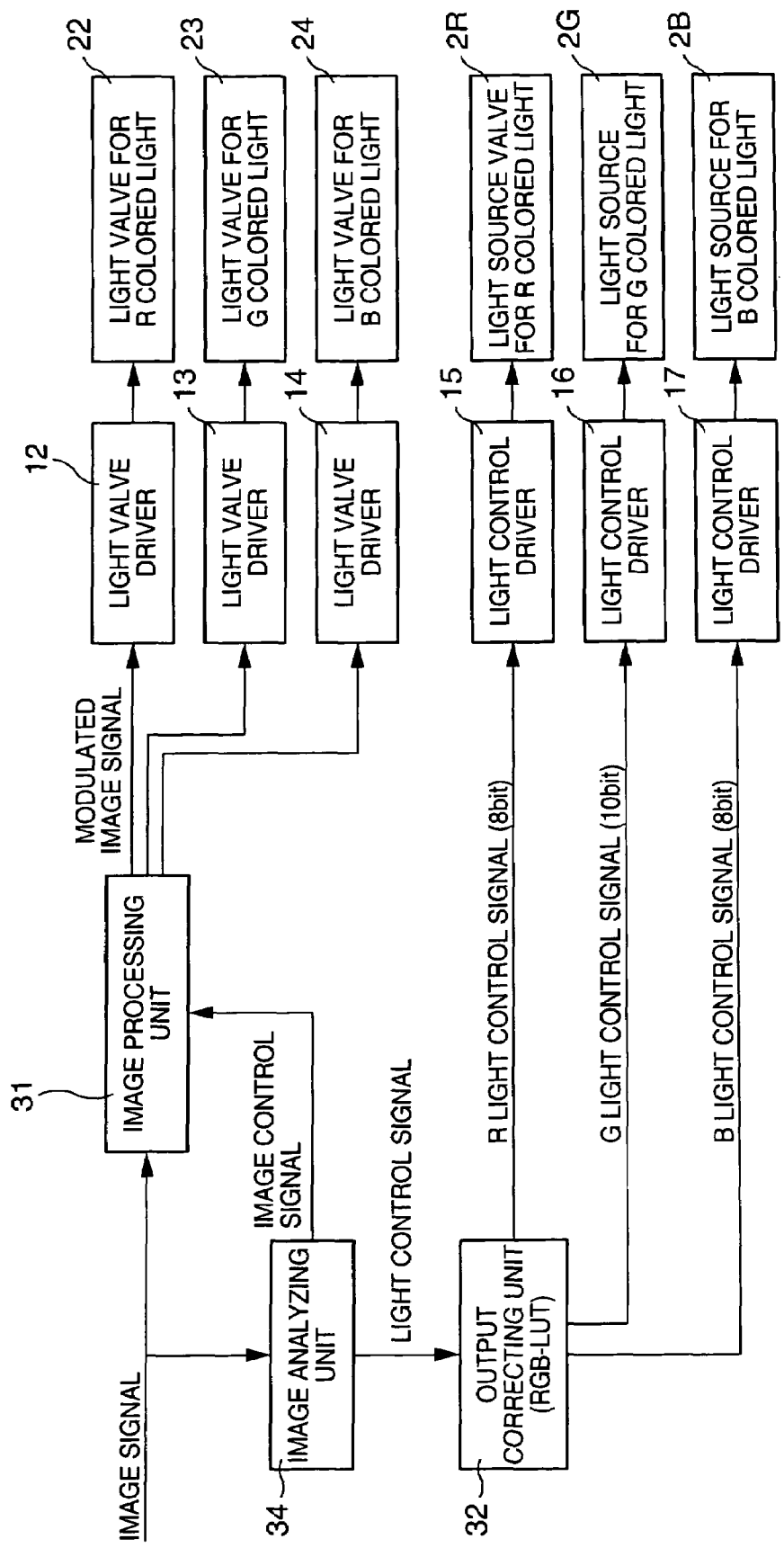
FIG. 2 is an exemplary block diagram of a drive circuit of the projection type display device as shown in FIG. 1.

Next, a light adjusting method applied to the projection type display device of the present embodiment will be described. FIG. 2 is a block diagram representing a drive circuit of the projection type display device as shown in FIG. 1.

First of all, an image signal is inputted to an image processing unit (image processing means) 31 and an image analyzing unit (image analyzing means) 34. The image analyzing unit 34 calculates an image processing parameter such as an expansion coefficient and an offset value by performing an analysis of the image signal, and supplies it as an image control signal to the image processing unit 31. The image processing unit 31 performs a predetermined image process on the image signal based on the received image control signal, and then, inputs it to the light valve drivers 12 to 14. The light valve drivers 12 to 14 controls the liquid crystal light valves 22 to 24 for each colored light component based on the received image signal.

Further, the image analyzing unit 34 controls light control drivers 15 and 16 based on the light control signal. These light control drivers 15 to 17 control respective corresponding light sources 2R, 2G and 2B, and control outputs of the respective light sources to change the amount of light component irradiated to liquid crystal light valves 22 to 24. Here, the light flux is the light flux for about one unit of time, and as a method for changing the light flux, there are, for example, a method for continuously emitting the light component by changing the light emitting intensity, a method for changing the light emitting period in which the intensity is constant, and a method for changing both the light emitting intensity and the light emitting period.

In other words, the projection type display device of the present embodiment analyzes the displayed image by means of the image analyzing unit 34, changes the flux of the light component irradiated from the light source, and keeps the overall image luminance with a predetermined image process (expansion process) by the image processing unit 31, so that a dynamic range of the liquid crystal light valve is fully used to effect a display, thereby realizing smooth rich tone. Further, because a black level (zero signal level) can be darkened by reduced light flux, it is possible to obtain a high contrast image darkened.

Figure 3:
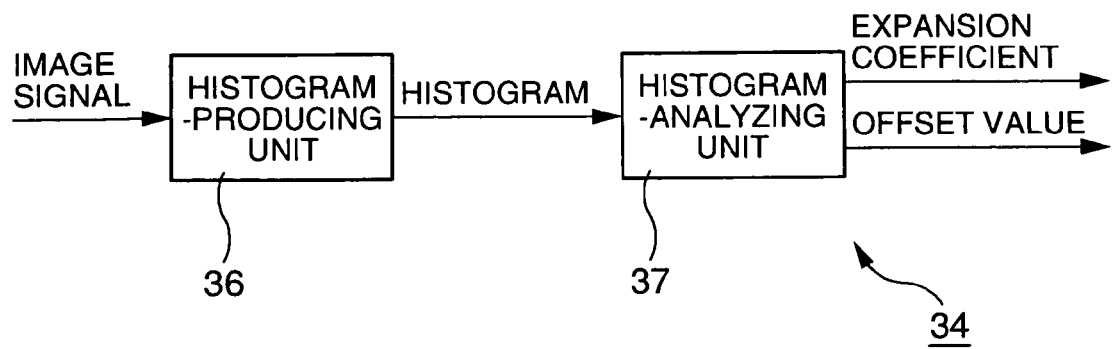
FIG. 3 is an exemplary block diagram of an image-analyzing portion.
Figure 4:
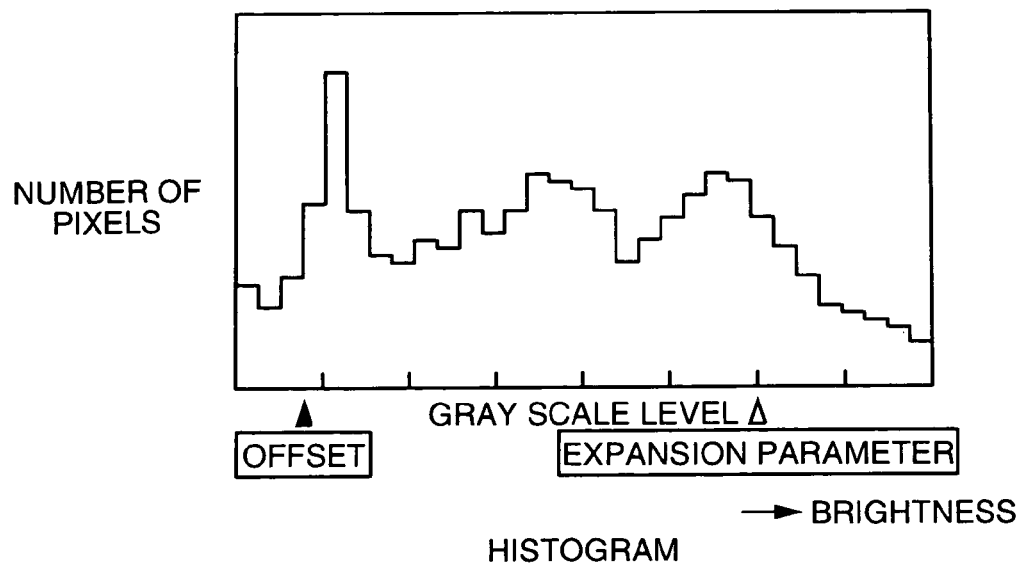
FIG. 4 is an example of a histogram according to the first embodiment.

The image analyzing unit 34, as shown in an exemplary block diagram in FIG. 3, can include a histogram-producing unit 36 and a histogram-analyzing unit 37. The histogram-producing unit 36 produces a histogram (frequency distribution for occurrence) for gray scale level, as shown in FIG. 4, from image data of the image signal inputted in a predetermined period (e.g., one frame). In FIG. 4, a horizontal axis indicates a gray scale level and a longitudinal axis indicates the number of pixels.

The produced histogram is supplied to the histogram-analyzing unit 37, and this histogram-analyzing unit 37 extracts characters of the displaying image from the received histogram, and calculates an expansion coefficient, an offset value or the like, which becomes an image processing parameter in the image processing unit 31, based on this feature.

The character, which can be extracted by the histogram-analyzing unit 37, includes the average value of, the maximum value of the luminance, the minimum value of the luminance, or the like. An operation of setting the image processing parameter based on each character is shown in the following (1) to (3).

(1) The average of the image signal represents most simply the brightness of the image. By an image processing parameter calculated using this average value, light adjustment can be carried out keeping the impression of the image. Further, because the average of the image signal can be obtained without producing a histogram, it is advantageous to simplify the construction of the image-analyzing portion 34.

Although as the average value of the luminance, the average of all pixels included in the image signal can be adopted, it is possible to apply a method of adopting the highest average value as an image processing parameter (expansion coefficient) from the plural average values for each area made by dividing the image of one frame, and comparing these average values.

(2) In the case of using a parameter that can be obtained from the luminance distribution of the image signal as a feature, the maximum frequency value of luminance distribution, a luminance value separated by a predetermined pixel number from maximum luminance (or a minimum luminance) or the like can be used. In the case of using these features, it is possible to set an image processing parameter with avoiding an unexpected data such as noise, and to effectively suppress a flickering screen due to light adjustment.

(3) Using the maximum value (the minimum value) of luminance of the image signal as the feature, since these values can be shared with the expansion coefficient (expansion parameter), the construction of the image analyzing unit 34 may be simplified, thereby realizing a low cost. Further, there is an advantage in that, since an image area, where tone is collapsed due to the expansion process, can be suppressed to a minimum, it is possible to obtain a display faithful to the inputted image signal. Further, it is advantageous to simplify the construction of the image-analyzing portion 34 since the maximum value and the minimum value of luminance of the image signal can be obtained without producing a histogram.

The expansion coefficient and the offset value calculated by the histogram-analyzing unit 37 are supplied as an image control signal to the image analyzing unit 31, and the expansion coefficient is supplied as the light control signal to the output correcting unit (output balance correcting means) 32.

The output correcting unit 32 has a lookup table (RGB-LUT) for giving power-irradiation characteristic of the lamps 7R, 7G and 7B comprised in the respective light sources 2R, 2G and 2B, and is adapted to input the output value of the light source determined based on the inputted expansion coefficient to the lookup table, and output it by referring to the practical output value of each of the light sources 2R, 2G and 2B. Using this configuration, it is possible to carry out proper light adjustment in which the variation in the light emitting flux due to the output property of the lamps 7R, 7G and 7B is corrected. Further, it is possible to suppress variations in the white balance of the projection image due to light adjustment, and to obtain high quality displayed image.

An example of the lookup table is shown in Table 1 below. Although this lookup table may store pre-measured output property of the light sources 2R, 2G and 2B as an initial value, it may measure and store the output property upon turning on or initiating the projection type display device. With such a construction for updating the lookup table at any time, it is possible to flexibly correspond to a slight property variation of the light sources 2R, 2G and 2B, thereby obtaining stable image quality over a long period.

TABLE 1

| INPUT | OUTPUT R | OUTPUT G | OUTPUT B |
|---|---|---|---|
| 0 | 16 | 64 | 14 |
| 1 | 17 | 66 | 16 |
| 2 | 18 | 69 | 20 |
| ... | ... | ... | ... |
| 253 | 253 | 1019 | 243 |
| 254 | 254 | 1021 | 248 |
| 255 | 255 | 1023 | 250 |

In the case of the present embodiment, as shown in Table 1, the signal resolution of the light control signal corresponding to the light source 2G of the green colored light component becomes higher as compared to that of the light sources 2R and 2B corresponding to the red colored light component and the blue colored light component. Specifically, the light control signal corresponding to the light source 2R and the light control signal corresponding to the light source 2B are 8 bits, respectively, while the light control signal corresponding to the light source 2G consists of 10 bits. Thus, the signal resolution of the light control signal becomes higher with respect to the light source 2G for outputting the green colored light component with a human's high relative luminous efficiency, and the output control is carried out more finely, resulting in an improvement in substantial gray scale display to the observer (audience). In other words, because it is possible to allow an observer to recognize the fine control on different colors by carrying out fine control on a color with a high relative luminous efficiency in which an observer sensibly recognizes a variation in luminance or chroma (chromaticity), it is possible to simplify the circuit construction of the output correcting unit 32 as compared to a case of adopting all signal resolution of the light control signal corresponding to three colors to be 10 bits, and to realize a projection type display device with excellent tone display at a low cost.

Subsequently, the light control drivers 15 to 17 control the output of each of the light sources 2R, 2G and 2B based on each light control signal supplied from the output-correcting portion 32. In the projection type display device of the present embodiment, since the lamps 7R, 7G and 7B of the light sources 2R, 2G and 2B are configured of light emitting diodes, the light flux can be adjusted by the light emitting amount of each light emitting diode element in changing the light flux based on the light control signal. Therefore, it is possible to effect proper light adjustment easily, and also to carry out exallent temporal controllability by the high-speed response of the light emitting diode element.

Figure 5:
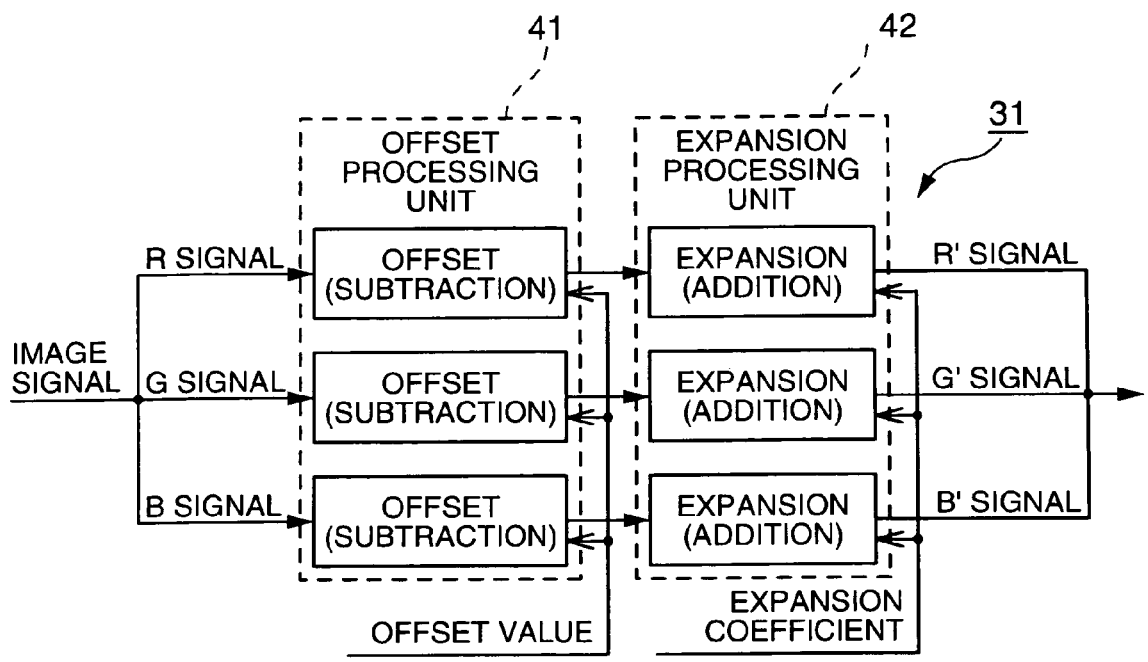
FIG. 5 is an exemplary block diagram of an image-processing portion.

On the other hand, the image-processing portion 31 comprises an offset processing unit 41 and an expansion-processing portion 42, as shown in the block diagram of FIG. 5.

The offset processing unit 41 is adapted to independently carry out an offset process on color signals (i.e., the R signal, the G signal, the B signal) corresponding to colored light components of respective light sources 2R, 2G and 2B separated from the inputted image signal, based on the offset value supplied from the image analyzing unit 34. This offset process is a process for subtracting the offset value extracted based on the histogram as shown in FIG. 4 from the image signal, and unnecessary dilute black drift in the display can be prevented by carrying out such a process. The offset value is set to, for example, the luminance (the gray scale value) of the darkest pixel of the image data of one frame or a predefined luminance (gray scale value), and black is darkened by intentionally collapsing the tone in an area having a luminance darker than the set luminance, thereby obtaining display with dark black.

The expansion processing unit 42 is adapted to independently carry out an expansion process on each of the color image signals (the R signal, the G signal and the B signal) subjected to the offset process, based on the expansion coefficient supplied from the image analyzing unit 34. This expansion process is a process of expanding an amplitude of the inputted image signal (color signal) to a dynamic range width of the liquid crystal light valve, and by carrying out such a process, display contrast can be improved using the dynamic range of the liquid crystal light valve fully.

In addition, an R' signal, a G' signal and a B' signal outputted from the expansion processing unit 42 are supplied to respective corresponding light valve drivers 12 to 14, and the liquid crystal light valves 22 to 24 are controlled by the light valve drivers 12 to 14, so that the respective colored light components are modulated.

Thus, in the projection type display device of the present embodiment, in order to carry out the display by changing the light flux, outputs of light sources 2R, 2G and 2B comprising the light emitting diodes as the lamps 7R, 7G and 7B are changed by the light control signal based on the inputted image signal, and then it is unnecessary to consider reliability or durability such as deterioration of the light adjusting element due to light irradiation or deterioration of a mechanical structure of the shutter, as in the case of carrying out light adjustment by blocking the light from a light source using a liquid crystal light adjustment element, a mechanical shutter or the like, and it is possible to provide a projection type display device with high reliability in a simplified construction. Further, because there is no light emitting spectral variation in the light emitting diode element by which output variation is accompanied as in the white light source, it is possible to carry out light adjustment while maintaining color tone without using a large sized correcting circuit, and then it is advantageous to make the display device at a low cost.

In addition, in operation of the projection type display device, the image processing parameter supplied by the image analyzing unit 34 may be employed as a parameter for an image signal of a subsequent frame in the image processing unit 31, and the image processing may be carried out in real time by delaying image signal transmission to the image processing unit 31 by the steps of the image analyzing unit 34 using a frame memory.

Figure 6:
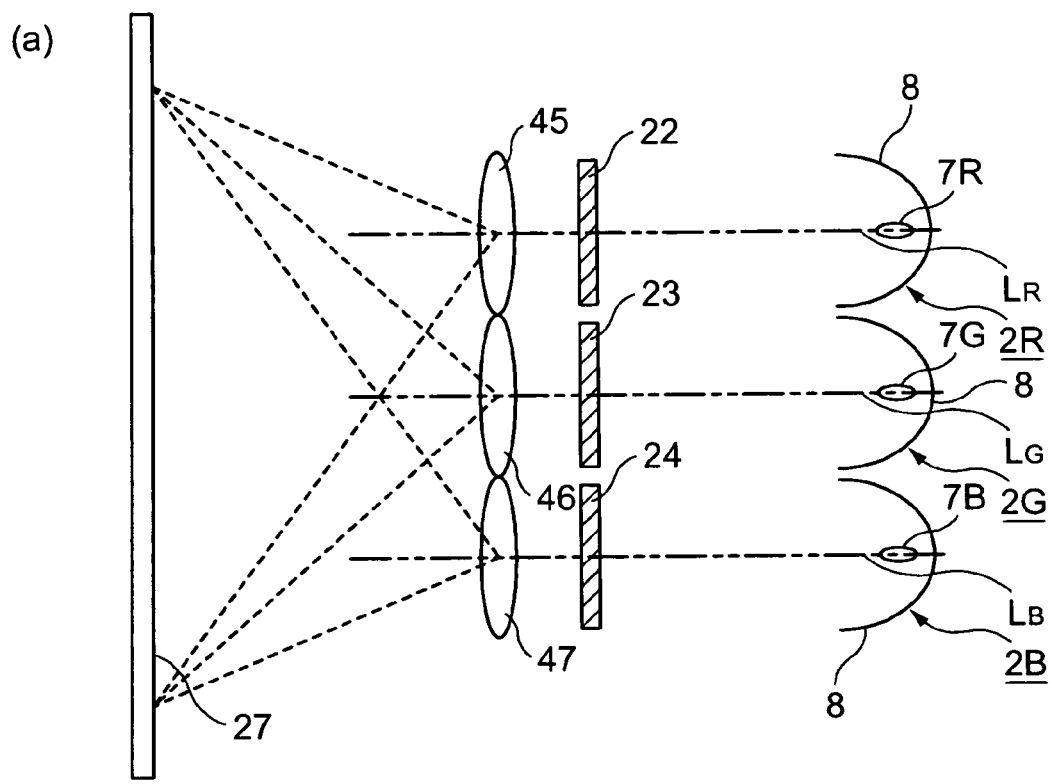
FIG. 6 is an example of another construction of the projection type display device according to the first embodiment.
Figure 6:
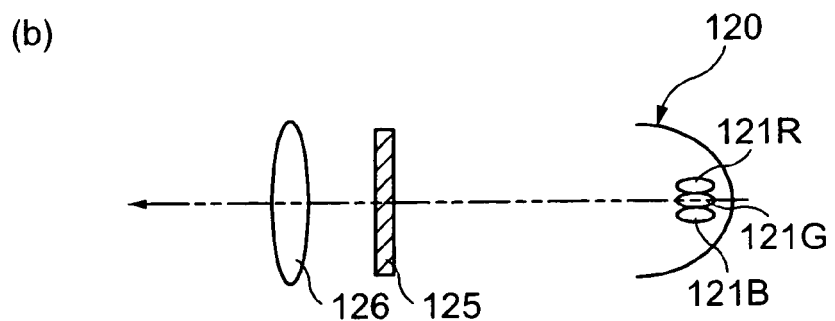

Although the configuration in which light components outputted from the liquid crystal light valves 22 to 24 are mixed by the dichroic prism 25, which is a color mixing system and are outputted to the projection system 26 is shown and described in the embodiment, the configurations as shown in FIGS. 6(*a*) and 6(*b*) may be adopted as the projection type display device according to the present embodiment.

The projection type display device as shown in FIG. 6(*a*) includes three light sources 2R, 2G and 2B in parallel arrangement, liquid crystal light valves 22 to 24 disposed correspondingly to respective light sources 2R, 2G and 2B, and projection systems 45 to 47 arranged at one side of the liquid crystal light valves 22 to 24. In this projection type display device, light component modulated by the liquid crystal light valves 22 to 24 is projected on the screen 27 by three projection systems 45 to 47, and the displayed image is imaged on this screen. The light sources 2R, 2G and 2B, and the liquid crystal light valves 22 to 24 have the same construction as that of each element as shown in FIG. 1.

Even in the projection type display device comprising the above-described construction, an image processing unit (not shown in FIG. 6) for carrying out a predetermined image processing on each colored light component is connected to each of the liquid crystal light valves 22 to 24, and the image signal subjected to the predetermined image processing in the image processing unit is supplied to each of the liquid crystal light valves 22 to 24 via the light valve drivers. Further, an image analyzing unit (not shown) is coupled to the light sources 2R, 2G and 2B via the light control drivers, and controls the output of each of the light sources 2R, 2G and 2B based on image signal analysis by the image analyzing unit. In addition, by carrying out a light adjustment display to which the above-described light adjusting method according to the present invention is applied, it is possible to realize rich tone display by enlarging the substantial dynamic range, as in the projection type display device according to the aforementioned embodiment.

On the other hand, the projection type display device as shown in FIG. 6(*b*) is a single panel projection type display device comprising an illumination system 120 having light sources 121R, 121G and 121B composed of light emitting diodes made to emit different colored light components, a liquid crystal light valve 125, and a projection system 126.

In addition, in the projection type display device comprising the construction, an image processing unit (not shown in FIG. 6) for carrying out a predetermined image process on each colored light component is connected to the liquid crystal light valve 125, and the image signal subjected to the predetermined image process in the image processing unit is supplied to each liquid crystal light valve 125 via the light valve driver. Further, an image analyzing unit (not shown) is connected to the light sources 121R, 121G and 121B via the light control drivers, and controls the output of each of the light sources 121R, 121G and 121B based on image signal analysis by the image analyzing unit. In addition, by carrying out a light adjustment display to which the above-described light adjusting method according to the present invention is applied, it is possible to realize smooth gray scale display by enlarging the substantial dynamic range, as in the projection type display device of the aforementioned embodiment.

In the case of the projection type display device comprising the construction as shown in FIG. 6(*b*), it is possible to realize two types of display manners of (1) a construction using the liquid crystal light valve 125 for a monochrome display, and (2) a construction using the liquid crystal light valve 125 for a color display.

(1) In the case of adopting the liquid crystal light valve 125 for the monochrome display, a color image is imaged on the projected screen by time-sequentially emitting the light sources 121R, 121G and 121B (e.g., for one 180th second) and displaying a content synchronized to the light emitting timing of each colored light on the liquid crystal light valve 125.

Since the projection type display device of the present embodiment includes light emitting diodes as the light sources 121R, 121G and 121B, it is possible to very easily carry out the switching of the output of the light source time-sequentially and also to make exallent temporal controllability.

(2) In the case of adopting the liquid crystal light valve 125 for the color display, a display is carried out by continuously emitting the light sources 121R, 121G and 121B and by irradiating a white colored light component produced by a mixed color to the liquid crystal light valve 125.

Since the projection type display device of the present embodiment can include light emitting diodes as the light sources 121R, 121G and 121B, it is possible to easily carry out the correction of white balance by independently controlling the output of each light source even though the white balance is changed due to light adjustment.

Next, the second embodiment of the invention will be described with reference to FIG. 7. The display device of the present embodiment is a projection type display device comprising an optical system as in the projection type display device of the first embodiment shown in FIG. 1, and a drive circuit shown in FIG. 7.

Figure 7:
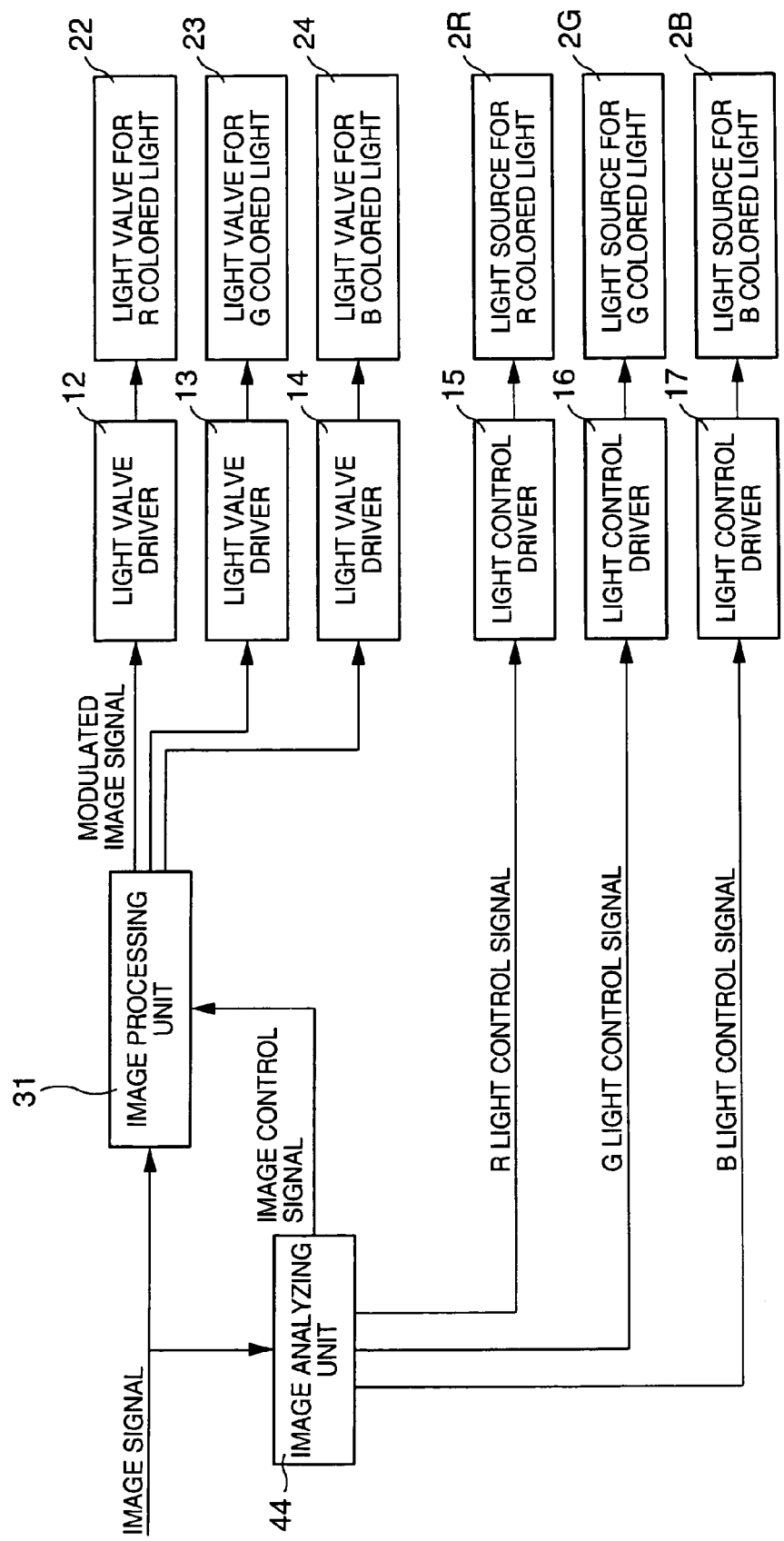
FIG. 7 is an exemplary block diagram of a drive circuit according to a second embodiment.

FIG. 7 is an exemplary block diagram of a projection type display device according to the present embodiment, and a difference from the block diagram shown in FIG. 2 is that an image analyzing unit 44 is disposed instead of the image analyzing unit 34, and a plurality of light control signals from the image analyzing unit 44 is supplied to the light control drivers 15 to 17.

Figure 8:
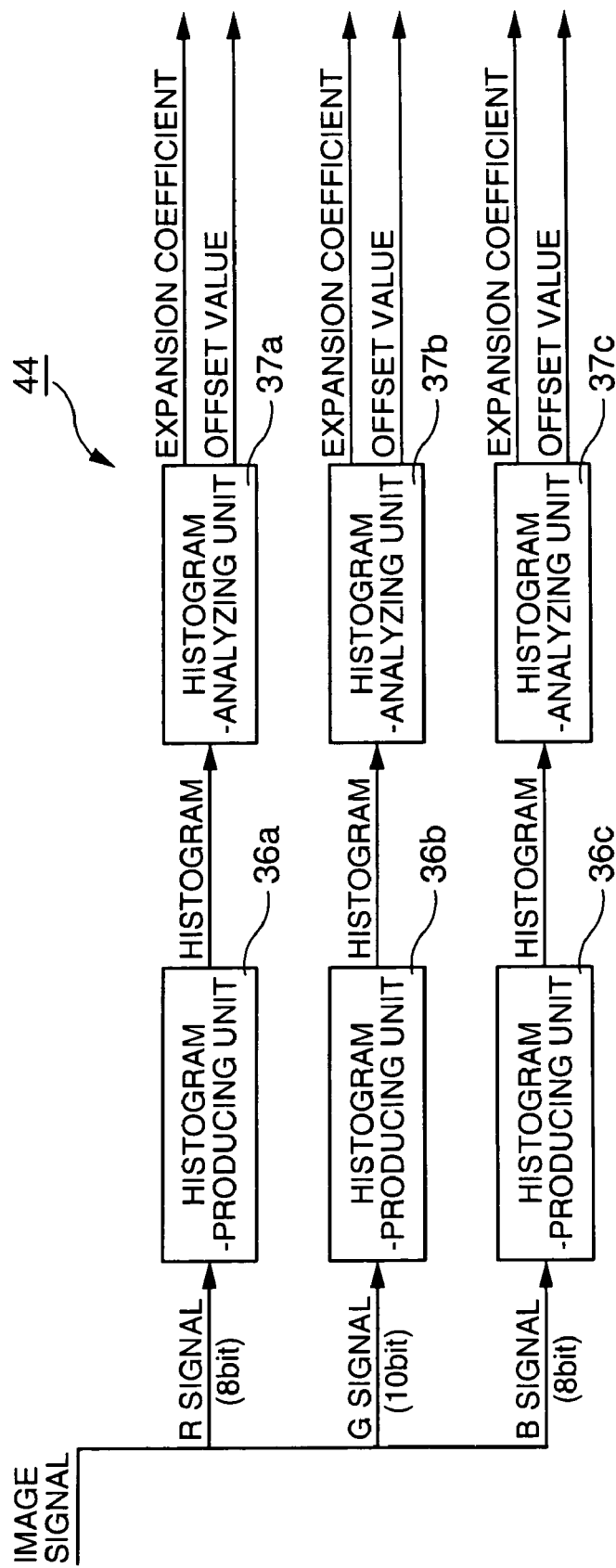
FIG. 8 is an exemplary block diagram of an image-analyzing portion.

The image analyzing unit 44 according to the present embodiment can include a configuration representing its block diagram in FIG. 8, and comprises histogram-producing units 36*a* to 36*c* for producing each histogram based on R signal, G signal and B signal divided from the image data of an image signal inputted in a predetermined period, and histogram-analyzing units 37*a* to 37*c* for analyzing each produced histogram. In addition, an expansion coefficient (image control signal and light control signal) and an offset value (image control signal) calculated by the histogram-analyzing units 37*a* to 37*c* are supplied to the image processing unit 31 and the light control drivers 15 to 17.

The present embodiment is adapted to be divided to color signals corresponding to the colored light components outputted from the light sources 2R, 2G and 2B before the image signal is inputted to the histogram-producing units 36*a* to 36*c*, but the signal resolution of the G signal is composed of 10 bits, and the signal resolution of the R signal and the B signal is composed of 8 bits, respectively, upon this signal division. In addition, a histogram is produced for each of the color signals inputted to the histogram-producing units 36*a* to 36*c*.

Figure 9:
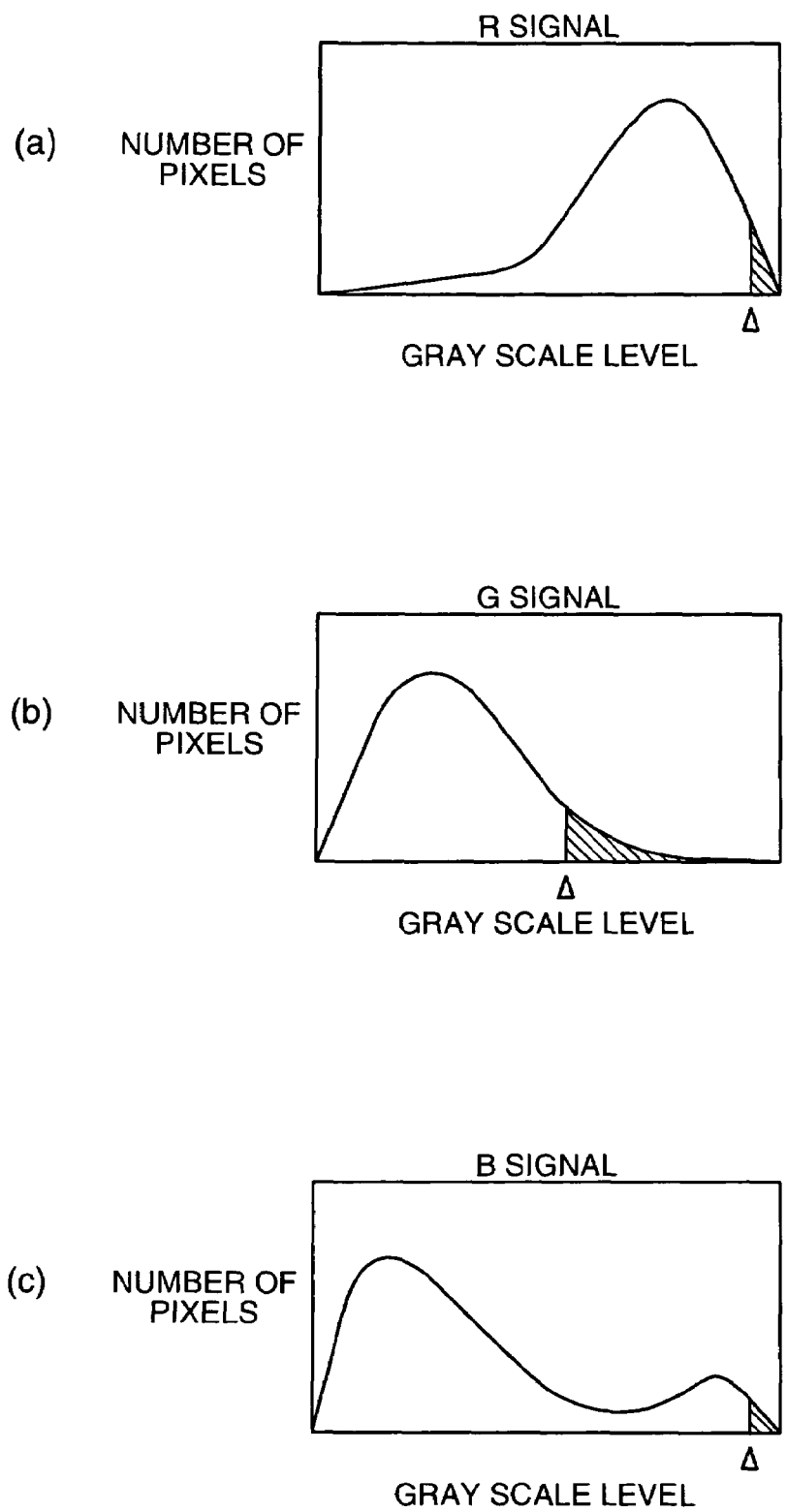
FIG. 9 is an example of a histogram according to the second embodiment.

FIG. 9 illustrates an example of a histogram produced in the image analyzing unit 44 according to the present embodiment, and FIGS. 9(*a*) to (*c*) illustrate histograms produced from the R signal, the G signal, and the B signal, respectively. In the histogram shown in FIGS. 9(*a*) to 9(*c*), a horizontal axis indicates a gray scale level and a longitudinal axis indicates the number of pixels.

In addition, the histogram-analyzing units 37*a* to 37*c* analyze the three supplied histograms, respectively, and calculate the expansion parameters (expansion coefficients) corresponding to the respective light sources 2R, 2G and 2B independently. That is, the expansion parameter indicated by a triangle marker in the horizontal axis of FIG. 9 are set for each of the R signal, the G signal and the B signal. In FIG. 9, a case is shown where a gray scale level of the pixel subtracted (counted) by a predetermined pixel number (e.g., 10%) from a pixel of a maximum gray scale level is adopted as the expansion parameter.

Subsequently, the histogram-analyzing units 37*a* to 37*c* supply the expansion coefficient as a light control signal to respective light control drivers 15 to 17. In addition, the output of each of the light sources 2R, 2G and 2B is controlled by each of the light control drivers 15 to 17.

The image analyzing method described in the first embodiment can be applied to the histogram analysis in the histogram-analyzing units 37*a* to 37*c*. Further, in the case of the present embodiment, since the histogram analysis is carried out for a histogram corresponding to each color signal, it is possible to derive an image processing parameter by changing the extraction methods from the histogram for each histogram. By allowing the feature for setting the image processing parameter to be changed for each histogram as described above, it becomes possible to set the image processing parameter more flexibly and accurately, thereby promoting improved image quality of the displayed image upon light adjustment.

On the other hand, the image processing unit 31 carries out a predetermined image process on the image signal by the offset processing unit 41 and the expansion processing unit 42 shown in FIG. 5, based on the expansion coefficient and the offset value received from the histogram-analyzing units 37*a* to 37*c*. In the case of the present embodiment, because an image control signal for each colored light component (color signal) is outputted from the image analyzing units 37*a* to 37*c*, each different offset value is inputted to a block for processing each color signal in the offset processing unit 41 shown in FIG. 5, and also, each different expansion coefficient is inputted to the block for processing each color signal in the expansion processing unit 42 as well.

The modified image signal is supplied to the light valve drivers 12 to 13, and a display corresponding to each colored light component is made in each of the liquid crystal light valves 22 to 24.

Thus, even in cases in which there is deflection in distribution of each colored light component as shown in FIG. 9, by setting the expansion parameter for each colored light component in the projection type display device of the present embodiment mode, it is possible to carry out the display in a suitable dynamic range width for each colored light component. As a result, it is possible to carry out the light adjustment effectively and accurately, thereby further promoting improved image quality of the display.

In the case of the present embodiment as described above, with respect to signal resolution (bit width) of each color signal supplied to the histogram-producing units 36a to 36c, the signal resolution of the G signal becomes higher as compared to other color signals. Thus, by carrying out gray scale control more minutely on a green colored light signal having a human's high relative luminous efficiency, it is possible to make a rich tone display of a display visually recognized by an observer without increasing the signal resolution of other color signals. Thus, it is possible to make a small-sized circuit of the image-analyzing portion 44 for the R signal and the B signal. As a result, it becomes a configuration advantageous to cost reduction of the projection type display device.

Further, in carrying out the display by changing the light flux even in the projection type display device of the present embodiment, since the outputs of the light sources 2R, 2G and 2B comprising the light emitting diodes as the lamps 7R, 7G and 7B are changed, it is unnecessary to consider reliability or duration such as deterioration of the light adjustment element due to light irradiation and deterioration of a mechanical structure of the shutter, and it is possible to provide a high reliable projection type display device in a simplified configuration, as in the case of carrying out the light adjustment by blocking the light component from the light source by a liquid crystal light adjustment element, mechanical shutter or the like.

Further, since the light emitting diode element does not have light emitting spectral variation by which output variation is accompanied as in a white colored light source, it is possible to carry out light adjustment with maintained color tone without using a large scale correcting circuit, and it is advantageous to making a low cost display device.

Although the form of the display device according to the invention has been described by way of the projection type display device in the first and second embodiments, it should be understood that the invention can be also applied to a direct display device. Further, although liquid crystal light valves are used as a light modulating device in the embodiment, DMD (digital macro-mirror device) or the like may be used as light modulating means.

What is claimed is:

1. A display device for displaying an image in accordance with an image signal, comprising:
   a plurality of light emitting diodes, each of which outputs different colored light components;
   an image analyzing device adapted to analyze the image signal, output a plurality of light control signals for controlling an output of each of the light emitting diodes, and calculate an expansion coefficient for expanding an amplitude of the image signal;
   an output correcting device adapted to correct the light control signals in order to suppress variations in a white balance of the image;
   a light control device adapted to receive the corrected light control signals and control the output of each of the light emitting diodes based on the corrected light control signals;
   an expansion processing unit adapted to expand the amplitude of the image signal based on the expansion coefficient calculated by the image analyzing device; and
   a light modulating device adapted to modulate each of the colored light components in accordance with the image signal, the amplitude of which has been expanded.

2. The display device according to claim 1,
   the image analyzing device outputting each of the light control signals based on an average value of a luminance of each of the color signals inputted in a predetermined period.

3. The display device according to claim 1,
   the image analyzing device outputting each of the light control signals based on a maximum value of a luminance of each of the color signals inputted in a predetermined period.

4. The display device according to claim 1,
   the image analyzing device outputting each of the light control signals based on a luminance distribution of each of the color signals inputted in a predetermined period.

5. The display device according to claim 1,
   the image analyzing device setting each of the light control signals using different features for each of the color signals.

6. The display device according to claim 1,
   the image analyzing device being able to output an image control signal to modulate the image signal, and
   the display device including an image processing device that modulates the image signal of the displayed image based on the image control signal.

7. An image display method for displaying an image in accordance with an image signal, comprising:
   providing a plurality of light emitting diodes, each of which outputs different colored light components;
   analyzing the image signal;
   outputting a plurality of light control signals for controlling an output of each of the light emitting diodes based on the analysis;
   calculating an expansion coefficient for expanding an amplitude of the image signal;
   correcting the light control signals in order to suppress variations in a white balance of the image;
   controlling the output of each of the light emitting diodes based on the corrected light control signal;
   expanding the amplitude of the image signal based on the expansion coefficient; and
   modulating each of the colored light components in accordance with the image signal, the amplitude of which has been expanded.

8. The light adjusting method of a display device according to claim 7,
   the light control signal being set based on different features for each of the color signals upon setting the light control signal in the image analyzing step.

* * * * *

UNITED STATES PATENT AND TRADEMARK OFFICE
CERTIFICATE OF CORRECTION

PATENT NO. : 7,639,220 B2  Page 1 of 1
APPLICATION NO. : 10/817806
DATED : December 29, 2009
INVENTOR(S) : Yoshida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1307 days.

Signed and Sealed this

Twenty-first Day of December, 2010

David J. Kappos
*Director of the United States Patent and Trademark Office*